United States Patent
Gordon et al.

(10) Patent No.: US 8,369,001 B2
(45) Date of Patent: Feb. 5, 2013

(54) COMPACT HIGH POWER TERAHERTZ RADIATION CELL

(75) Inventors: Daniel F Gordon, Waldorf, MD (US); Antonio C Ting, Silver Spring, MD (US); Phillip A Sprangle, Great Falls, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 370 days.

(21) Appl. No.: 12/504,769

(22) Filed: Jul. 17, 2009

(65) Prior Publication Data

US 2011/0012036 A1    Jan. 20, 2011

(51) Int. Cl.
G02F 1/35 (2006.01)
G02F 2/02 (2006.01)
(52) U.S. Cl. .......................................... 359/326; 372/21
(58) Field of Classification Search .................. None
See application file for complete search history.

(56) References Cited

U.S. PATENT DOCUMENTS

| | | | |
|---|---|---|---|
| 5,543,960 A | 8/1996 | Carrig et al. | |
| 5,729,017 A | 3/1998 | Brener et al. | |
| 6,144,679 A | 11/2000 | Herman et al. | |
| 6,753,662 B1 | 6/2004 | Krafft | |
| 7,272,158 B1 * | 9/2007 | Hayes et al. | 372/21 |
| 7,349,609 B1 * | 3/2008 | Vodopyanov et al. | 385/122 |
| 7,601,977 B2 * | 10/2009 | Yeh et al. | 250/504 R |
| 7,965,440 B2 * | 6/2011 | Holzwarth et al. | 359/326 |
| 2001/0038074 A1 | 11/2001 | Zhang et al. | |
| 2003/0066968 A1 | 4/2003 | Ziolo | |
| 2004/0238760 A1 * | 12/2004 | Linfield et al. | 250/493.1 |
| 2007/0297734 A1 | 12/2007 | Ibanescu et al. | |
| 2008/0159342 A1 | 7/2008 | McCaughan et al. | |
| 2011/0228380 A1 * | 9/2011 | Benton et al. | 359/328 |
| 2012/0032081 A1 * | 2/2012 | Itsuji | 250/340 |

FOREIGN PATENT DOCUMENTS

WO    WO-2007121598 A1    11/2007

OTHER PUBLICATIONS

Fernelius, et al., "Efficent, Tunable, and Coherent 0.18-5.27-Thz Source based on GaSe Crystal", Optics letters, vol. 27, No. 16, pp. 1454-1456, (Aug. 15, 2002).

Ding, et al., "Second-Order Nonlinear Optical Materials for Efficient Generation and Amplification of Temporally-Coherent and Narrow-Linewidth Terahertz Waves", Optical and Quantum Electronics, vol. 32, pp. 531-552, (2000).

* cited by examiner

*Primary Examiner* — Hemang Sanghavi
(74) *Attorney, Agent, or Firm* — Amy L. Ressing; L. George Legg

(57) ABSTRACT

A device for generating terahertz radiation using a phase matched optical rectification technique. The device converts laser radiation to terahertz radiation via a particular type of photonic downconversion. The device includes a crystalline material suitable for photonic downconversion of laser radiation, a first coupling component for coupling the laser radiation to the crystalline material and a second coupling component for coupling the generated terahertz radiation from the crystalline material to the environment. By sustaining the phase matching condition over a significant distance, the device is capable of providing terahertz radiation with high peak and average power. Also disclosed is a method for generating terahertz radiation including the steps of optically coupling laser radiation to a crystalline material suitable for downconversion of the laser radiation to terahertz radiation, downconverting the laser radiation to terahertz radiation and optically coupling the generated terahertz radiation from the crystalline material to the environment.

10 Claims, 1 Drawing Sheet

COMPACT HIGH POWER TERAHERTZ RADIATION CELL

BACKGROUND OF THE INVENTION

1. Field of the Invention

The present invention relates to the field of generating terahertz radiation. More specifically, the invention pertains to terahertz radiation generation using a phase matched optical rectification technique.

2. Description of the Related Technology

Terahertz radiation is an electromagnetic wave with a frequency on the order of one trillion cycles per second. It is potentially useful for many detection applications because of the fact that many materials that are opaque when viewed with visible light, become transparent when viewed using terahertz radiation. For example, a terahertz image can be employed to reveal weapons concealed under clothing. Although x-rays can also be used for this purpose, terahertz radiation has the advantage that it is non-ionizing and therefore it is expected to be relatively harmless to human tissue.

Terahertz radiation is also of interest for use in spectroscopic applications due to the fact that many molecules have spectroscopic signatures in the terahertz frequency range. Terahertz radiation also has applications in communications, electronic material characterization and the development of high-speed optoelectronic devices. Terahertz radiation systems can also be used to monitor public facilities and detect toxic chemicals and biologic agents, as well as trace explosives in a continuous autonomous manner.

There are several approaches to the generation of terahertz radiation. One approach involves the use of photoconductors. Another approach employs nonlinear optical frequency conversion techniques. In the nonlinear optical frequency conversion approach, second or higher order nonlinear effects in unbiased materials are used. One useful technique is the optical rectification approach which is simpler than the photoconductive approach since no electrical bias is required.

A variety of different electro-optic materials have been proposed for terahertz optical rectification media. U.S. Pat. No. 5,543,690 discusses a number of these materials. U.S. Pat. No. 5,543,690 also describes an apparatus for generating high energy terahertz radiation including a laser effective to produce subpicosecond optical pulses and a mosaic comprising a plurality of planar electro-optic crystals fastened together edge to edge. Each of the crystals is oriented so that its molecular dipole axis is oriented in the form of a grid in optical communication with the subpicosecond optical pulses. The plurality of crystals are said to behave as a single large electro-optic crystal to produce high energy terahertz radiation by optical rectification.

One of the primary problems to the utilization of terahertz radiation in practical applications is the lack of efficient and convenient terahertz radiation sources. One physical process which has been exploited to generate terahertz radiation is photonic downconversion. Photonic downconversion is a set of methods whereby laser radiation is converted to radiation of a lower frequency as it passes through a crystal.

Gallium selenide has been identified as a highly nonlinear, low loss crystal with favorable phase matching characteristics. Ding, Y. and Zotova, I., "Second-order nonlinear optical materials for efficient generation and amplification of temporally-coherent and narrow-linewidth terahertz waves," *Optical and Quantum Electronics* 32, pp. 531-552 (2000). Power conversion efficiencies of $10^{-4}$ have been reported using such gallium selenide crystals. Shi, W., et al., "Efficient, tunable, and coherent 0.18-5.27 THz source based on GaSe crystal," *Optics Lett.* 27, pp. 1454-1456 (2002). However, these experiments required elaborate optical systems and produced very little terahertz power.

One problem with gallium selenide downconversion is that it is difficult to sustain the phase matching condition over a sufficient distance to generate significant amounts of terahertz power. This problem is further complicated by the fact that the mechanical properties of gallium selenide crystals precludes the possibility of cutting or polishing the crystal. Also, efficient coupling of the pump radiation into the gallium selenide crystal at the correct angle and efficient coupling of the terahertz radiation from the gallium selenide crystal to the environment both present difficulties.

Although the gallium selenide crystals cannot be cut or polished, these crystals can be cleaved along planes orthogonal to the internal "crystal axis" to produce a polished surface. Nevertheless, the inability to machine the gallium selenide crystals creates a problem in terms of coupling into the correct phase matching angle. In particular, the index of refraction for 800 nm pump radiation in gallium selenide is about $\eta_0=2.85$. Using Snell's law, one finds that the largest possible angle of propagation with respect to the crystal axis (corresponding to an angle of incidence of 90°) is about 20.5°. This is significantly less than the phase matching angle of about 28° needed to generate radiation with a 300 μm wavelength. Further, the reflection losses at the surface would be unacceptably high for such large angles of incidence.

The phase matching angle can be calculated using the formula: $n_\theta(\omega s)=n_g(\omega_0)$. In other words, the phase velocity of the THz radiation must equal the group velocity of the laser pulse. This condition arises because the phase of the source (i.e. the nonlinear polarization wave) at a given point is determined by the derivative of the envelope of the laser pulse at that point. Therefore, the phase of the source stays synchronous with the phase of the THz wave when the laser envelope moves at the THz phase velocity. For GaSe, the phase matching angle can be determined as a function of the signal wavelength using the GaSe dispersion relation in V. G. Dimitriev, et al., "*Handbook of Nonlinear Optical Crystals*," Springer, Heidelberg, 1999.

SUMMARY OF THE INVENTION

The present invention relates to a device for generating terahertz radiation using a phase matched optical rectification technique. The device converts laser radiation to terahertz radiation via a particular type of photonic downconversion. The device includes a crystalline material suitable for photonic downconversion of laser radiation, a first coupling component for coupling the laser radiation to the crystalline material and a second coupling component for coupling the generated terahertz radiation from the crystalline material to the environment. By sustaining the phase matching condition over a significant distance, the device is capable of providing terahertz radiation with high peak and average power.

In a second aspect, the present invention relates to a method for generating terahertz radiation. The method includes the steps of optically coupling laser radiation to a crystalline material suitable for downconversion of the laser radiation to terahertz radiation, downconverting the laser radiation to terahertz radiation and optically coupling the generated terahertz radiation from the crystalline material to the environment. The method of the invention sustains the phase matching condition over a significant distance to thereby provide terahertz radiation with high peak and average power.

DETAILED DESCRIPTION OF THE PREFERRED EMBODIMENT(S)

Figure 1:
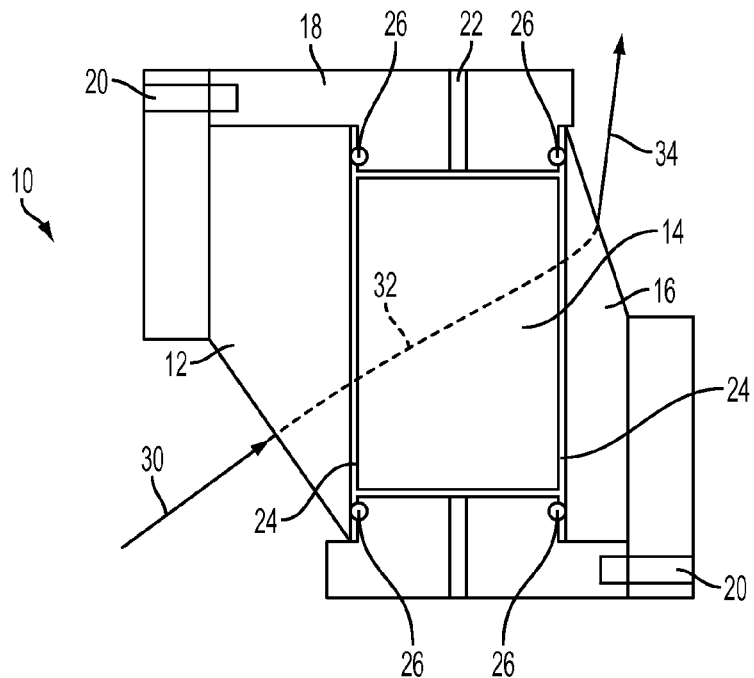
FIG. 1 is a schematic of one embodiment of a terahertz radiation generation device in accordance with the present invention.

The present invention relates to a device for generating terahertz radiation using a phase matched optical rectification technique. The device converts laser radiation to terahertz radiation via a particular type of photonic downconversion. By sustaining the phase matching condition over a significant distance, the device is capable of providing terahertz radiation with high peak and average power.

The device includes a crystalline material suitable for photonic downconversion of laser radiation, a first coupling component for coupling the laser radiation to the crystalline material and a second coupling component for coupling the generated terahertz radiation from the crystalline material to the environment. The invention combines three crystalline or polycrystalline materials with an index matching liquid to form a relative small terahertz generating device. Alternatively, press fitting of the materials with very high mechanical tolerances or diffusion bonding of the materials could potentially be used to optically couple the materials. The device may be positioned at the output of a laser and terahertz radiation is produced.

The device of the invention employs optical rectification in a crystal having suitable properties. The device sustains the phase matching condition over a significant distance by causing the laser pulses to propagate in the crystalline material in a particular direction with respect to the internal structure of the crystalline material.

The invention accomplishes this by incorporating a crystalline material capable of photonic downconversion of the laser radiation into a device which includes a first coupling component for coupling the laser radiation into the crystalline material and a second coupling component for coupling the generated terahertz radiation from the crystalline material to the environment. The first coupling component preferably includes a first crystalline or polycrystalline coupling material and an index matching liquid to eliminate the possibility of an air gap between the first coupling component and the crystalline material. The device of the invention can be used to generate terahertz radiation having high peak and average power.

The device of the present invention can be used with any picosecond or femtosecond laser. By "picosecond or femtosecond laser" is meant a laser having a pulse length of from about 0.2 to 5.0 picoseconds and pulse energies greater than about 0.1 millijoules up to a maximum of about 10 millijoules. Also, the present invention may be employed with lasers having wavelengths of from about 0.7 μm to about 2.0 μm, and more preferably, from about 0.8 μm to about 1.0 μm. In order to make a suitable terahertz radiation generator for a particular laser, the materials used in the first and second coupling components and/or the crystalline material can be varied to render the device suitable for the output of that particular laser.

More specifically, the procedure for making a device suitable for a particular laser is as follows. First, the frequency ($v_T$) of the terahertz radiation using the formula 1:

$$v_T = 1/2\tau_L \quad (1)$$

where $\tau_L$ is the laser pulse length. The phase matching angle (74) is then calculated by using the formula: $n_\theta(\omega s) = n_g(\omega_0)$. In other words, the phase velocity of the THz radiation must equal the group velocity of the laser pulse. This condition arises because the phase of the source (i.e. the nonlinear polarization wave) at a given point is determined by the derivative of the envelope of the laser pulse at that point. Therefore, the phase of the source stays synchronous with the phase of the THz wave when the laser envelope moves at the THz phase velocity. For GaSe, the phase matching angle can be determined as a function of the signal wavelength using the GaSe dispersion relation in V. G. Dimitriev, et al., "*Handbook of Nonlinear Optical Crystals*," Springer, Heidelberg, 1999. The angle of incidence at the interface of the index matching liquid and the crystalline material is then determined using Snell's law:

$$n_1 \sin \theta_1 = n_2 \sin \theta_2.$$

where $n_1$ and $n_2$ are the indices of refraction of the material and the phase matching angle is used as the angle of refraction. Similarly, the angle of incidence at the interface of the first coupling material and the index matching liquid can also be calculated using Snell's law. This angle of incidence is also the wedge angle for the first coupling material.

Snell's law is then also used to compute the angle of refraction at the interface of the crystalline material and the second coupling material, again using the phase matching angle as the angle of incidence. Using the formula for Brewster's angle:

$$\theta_B = \arctan\left(\frac{n_2}{n_1}\right),$$

the angle of incidence at the interface between the second coupling material and air can be determined. Snell's law can be used to get the angle of refraction. The wedge angle for the second coupling material is the difference between the angle of refraction at the interface between the crystalline material and the second coupling material and the angle of incidence at the interface between the second coupling material and the air.

Once all of the angles have been determined, first and second coupling material and/or index matching liquids having suitable indices of refraction can be chosen to provide the desired phase matching with the crystalline material selected for the particular laser that is employed.

The first coupling material can be any material with a suitable index of refraction for coupling the laser pump radiation to the crystalline material and having suitable absorption characteristics at the frequency of the pump laser. Suitable absorption characteristics may be, for example, an absorption length of 3 centimeters or greater at the laser wavelength. Also, a material with an index of refraction from about 2.0 to about 3.0 may be employed. One exemplary first coupling material may be zinc sulfide. Preferably, the zinc sulfide is manufactured in a form that has favorable optical properties for this particular use, as discussed above. One suitable zinc sulfide material is Cleartran™ which is a water-free form of zinc sulfide. A chemical vapor deposited (CVD) material, Cleartran™ multi-spectral zinc sulfide has low absorption and scatter properties over its relatively broad transmission range. Other materials which may be used as the first coupling material in specific embodiments of the terahertz radiation generating device of the present invention include, but are not limited to glass, fused silica, quartz, magnesium fluoride, calcium fluoride, lithium niobate and zinc selenide.

A suitable index matching liquid for the first coupling material is then selected having a suitable refractive index to match, as closely as possible, the refractive index of the first coupling material. Suitable index matching liquids are known to persons skilled in the art and can be obtained from a variety of commercial sources. Exemplary index matching liquids will have indices of refraction of from about 2.0 to about 3.0. Suitable refractive index matching liquids include, but are not limited to, Cargille Labs products 1815X, 1818X, 1821X, 1833X and 1836X.

The crystalline material can be any material capable of photonic downconversion of the particular input laser radiation. One suitable crystalline material is gallium selenide. Other suitable crystalline materials include, but are not limited to, $LiTaO_3$, $LiNbO_3$, $BaTiO_3$, $LiIO_3$, ZnS, ZnTe, ZnSe, quartz, CuCl, InAs, InP, GaP, GaAs, $NH_4H_2PO_4$, $KH_2PO_4$, deuterated $KH_2PO_4$, rubidium dihydrogen phosphate, ammonium dihydrogen arsenate, potassium dihydrogen arsenate, rubidium dihydrogen arsenate, cesium dihydrogen arsenate, and deuterated cesium dihydrogen arsenate.

Preferably, the size of the crystalline material is selected to provide a desired propagation distance of the radiation in the crystalline material. The propagation distance is measured along the path of the radiation through the crystalline material from the interface between the first coupling component and the crystalline material to the interface between the crystalline material and the second coupling component. Suitable propagation distances may vary from about 1 cm to about 10 cm and, more preferably, the propagation distance should be from about 2 cm to about 7 cm. Most preferably, the propagation distance of the radiation in the crystalline material is from about 2.5 cm to about 5.0 cm since this propagation distance is sufficient to provide a high terahertz radiation energy per pulse, while substantially minimizing the size of the device and thus the amount of crystalline material required.

The second coupling material can be any material with a suitable index of refraction for coupling the terahertz radiation from the crystalline material to the environment at the frequency of the terahertz radiation, such as a material with an index of refraction from about 2.0 to about 3.0. The same materials listed above as being useful as the first coupling material may also be used as the second coupling material though in a particular device, the first and second coupling materials may be different due to the different optical requirements imposed thereon.

An index matching material located at the interface between the crystalline material and the second coupling material is not necessary since the wavelength of the generated terahertz radiation can be longer than mechanical tolerances in the apparatus. As a result, the interface between the crystalline material and the second coupling material can be regarded as a single interface even in the absence of an index matching liquid. However, in some embodiments of the invention, particularly those where the wavelength of the generated terahertz radiation is not longer than mechanical tolerances in the apparatus, it may be desirable to include an index matching liquid at the interface between the crystalline material and the second coupling material.

Referring now to FIG. 1, there is shown a schematic representation of an embodiment of a terahertz radiation generating device 10 in accordance with the present invention. The device includes a first coupling material 12, a crystalline material 14 and a second coupling material 16, affixed together by a frame 18. The frame 18 in this case includes bolt holes 20 for bolts, not shown, to affix portions of frame 18 together as shown. Frame 18 has for its purpose to maintain the relative positioning of the first and second coupling materials 12, 16 and the crystalline material 14. Thus, any suitable means for accomplishing this purpose may be substituted for frame 18 within the scope of the present invention. Frame 18 may be fabricated from any suitable material such as, for example, aluminum.

Frame 18 includes a liquid fill inlet 22 fluidly connected to a channel 24 which surrounds crystalline material 14, as shown in FIG. 1. Channel 24 is adapted to contain an index matching fluid and is positioned at the interfaces between the crystalline material 14 and the first and second coupling materials 12, 16. O-ring seals 26 may be provided to contain the index matching fluid in channel 24.

In operation of the device 10 of FIG. 1, channel 24 is first filled with a suitable index matching fluid via liquid fill inlet 22. Subsequently, pump laser radiation beam 30 is directed to the first coupling material 12 and is transmitted through first coupling material 12, the index matching fluid, the crystalline material 14 and the second coupling material 16 along the path 32 shown in FIG. 1. Crystalline material 14 downconverts laser beam 30 into a terahertz radiation beam 34 which passes out of the device 10 to the environment.

The device 10 of the invention is capable of delivering terahertz radiation with about 500 kW of peak power using a relatively compact system. The device 10 of the invention is very easy to use compared to other terahertz radiation generating systems. In use, the device 10 is placed at the output of a standard laser having a pulse length of from about 0.2 to about 5.0 picoseconds and a pulse energy greater than 0.1 mJ. Device 10 may optionally be mounted in a rotatable frame, not shown, to allow fine tuning by rotation of the device 10 relative to the incident laser radiation.

In a second aspect, the present invention relates to a method for generating terahertz radiation. The method includes the steps of optically coupling laser radiation to a crystalline material suitable for downconversion of the laser radiation to terahertz radiation, downconverting the laser radiation to terahertz radiation and optically coupling the generated terahertz radiation from the crystalline material to the environment.

Optionally, the method may include the additional step of phase matching a first coupling material to the crystalline material. A further optional step in the method is phase matching the second coupling material to the crystalline material.

The method of the invention sustains the phase matching condition over a significant distance to thereby provide terahertz radiation with high peak and average power.

The invention will now be illustrated by the following example.

EXAMPLE

A computer simulation of a device 10 according to FIG. 1 was carried out. The computer simulation employed Cleartran™ zinc sulfide as the first coupling material 12, gallium selenide as the crystalline material 14, and quartz as the second coupling material 16. A suitable index matching fluid for Cleartran™ zinc sulfide was employed in the simulation. Cleartran™ zinc sulfide has an index of refraction of 2.3 at a wavelength of 800 nm. As a result, the reflection losses and the refraction angle are not severe at the interface between the zinc sulfide and gallium selenide. The Cleartran™ zinc sulfide forms a window that can be machined and anti-reflection coated. The anti-reflection coating reduces reflection at the interface between the air and the Cleartran™ zinc sulfide first coupling material.

Snell's law gives the angle of incidence at the interface between the Cleartran™ zinc sulfide and the gallium selenide as about 35.6°. Applying the Fresnel formula gives a reflection coefficient of less than 2%.

The quartz second coupling material has an index of refraction of 2.1 for 1 terahertz radiation and a loss tangent of $10^{-4}$. Because of the fact that the wavelength of the terahertz radiation can be longer than mechanical tolerances in the apparatus, the interface between the quartz and gallium selenide can be regarded as a single interface even in the absence of an index matching liquid. In addition, terahertz radiation reflections at the quartz-air interface can be minimized by cutting the window at Brewster's angle for the frequency of the generated terahertz radiation. This provides an overall 99% coupling efficiency of the terahertz radiation into the environment.

The laser parameters considered were a 10 kHz repetition rate, a 500 femtosecond pulse length, an 800 nm wavelength and a 0.5 mJ pulse energy. For these parameters, the peak terahertz radiation power generated by the device 10 is about 1 MW, and the average power is about 50 mW. The propagation angles of the laser radiation and generated terahertz radiation in each material is given in Table 1. The laser is s-polarized and the generated terahertz radiation is p-polarized. The azimuthal angle of the gallium selenide crystal is $\phi=0$, where $\phi$ is defined according to the usual convention from nonlinear optics as described, for example, in the textbook, Boyd, R., *Nonlinear Optics*, $2^{nd}$ ed., Academic Press, San Diego (2003).

TABLE 1

| Interface | Type of Angle | Angle in Degrees |
| --- | --- | --- |
| Air-ZnS | Incidence | 0 |
| Air-ZnS | Refraction | 0 |
| ZnS-index matching liquid | Incidence | 35.6 |
| ZnS-index matching liquid | Refraction | 35.6 |
| index matching liquid-GaSe | Incidence | 35.6 |
| index matching liquid-GaSe | Refraction | 28.0 |
| GaSe-quartz | Incidence | 28.0 |
| GaSe-quartz | Refraction | 44.4 |
| quartz-air | Incidence | 25.5 |
| quartz-air | Refraction | 64.5 |

Figure 2:
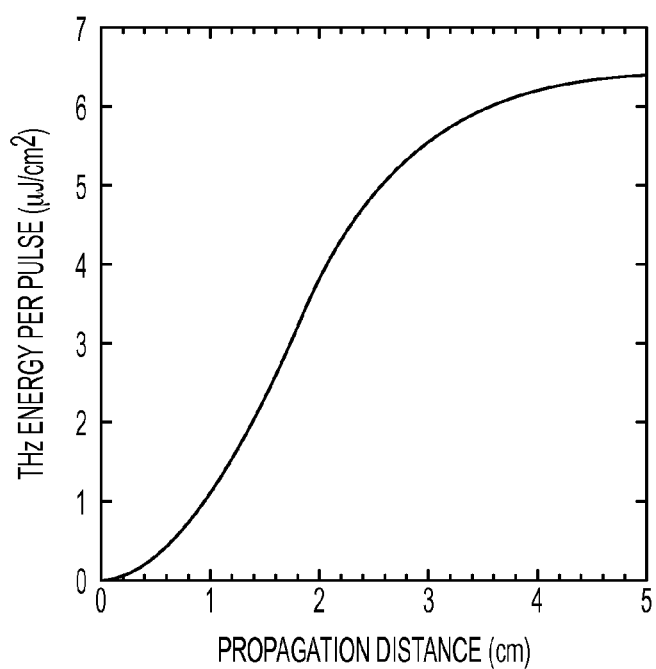
FIG. 2 is a graph of a simulated terahertz energy per pulse generated by the device of the invention using a laser intensity of 2 GW/cm$^2$ and varying the propagation distance through a gallium selenide crystalline material.

FIG. 2 shows the terahertz radiation energy per pulse as a function of the propagation distance of the radiation through the gallium selenide crystal material as computed by the simulation model. A laser intensity of 1 GW/cm² was used for this simulation. The average power depends on the repetition rate of the laser. For example, a repetition rate of 10 kHz would give about 50 mW of average power for a 2.5 cm propagation distance in the gallium selenide crystal.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method for generating terahertz (THz) radiation comprising the steps of:
    optically coupling laser radiation to a crystalline material suitable for downconversion of the laser radiation to terahertz radiation;
    downconverting the laser radiation to terahertz radiation with a laser envelope that moves at a THz phase velocity and wherein the laser radiation and the terahertz radiation propagate collinearly in the crystalline material; and
    optically coupling the generated terahertz radiation from the crystalline material to the environment.

2. A method as claimed in claim 1, wherein the laser radiation produced by said laser is a pulsed laser radiation having a pulse length of from about 0.2 to about 5.0 picoseconds.

3. A method as claimed in claim 2, wherein the laser radiation has a pulse energy greater than 0.1 millijoules.

4. A method as claimed in claim 1, wherein a propagation distance traveled by the radiation through the crystalline material is from about 1 cm to about 10 cm.

5. A method as claimed in claim 1, wherein a propagation distance traveled by the radiation through the crystalline material is from about 2 cm to about 7 cm.

6. A method as in claim 1, wherein the laser radiation is produced by a standard picosecond laser.

7. A method as in claim 1, wherein the laser radiation is produced by a standard femtosecond laser.

8. A method as in claim 1, wherein the optical coupling is achieved using an index-matching liquid.

9. A method as in claim 8, wherein the index-matching liquid has- an index of refraction in the range of from about 2.0 to about 3.0.

10. A method as claimed in claim 1, wherein:
    the optical coupling is achieved by joining an optical material to the crystalline material using an index matching liquid;
    a relative speed of the laser envelope and the THz phase velocity are controlled by tuning an angle of propagation of the laser envelope with respect to an internal structure of the crystalline material; and
    the optical coupling allows the laser envelope to propagate at a correct angle even when the crystalline material is cleaved in a fixed plane with respect to the internal structure.

* * * * *